UNITED STATES PATENT OFFICE.

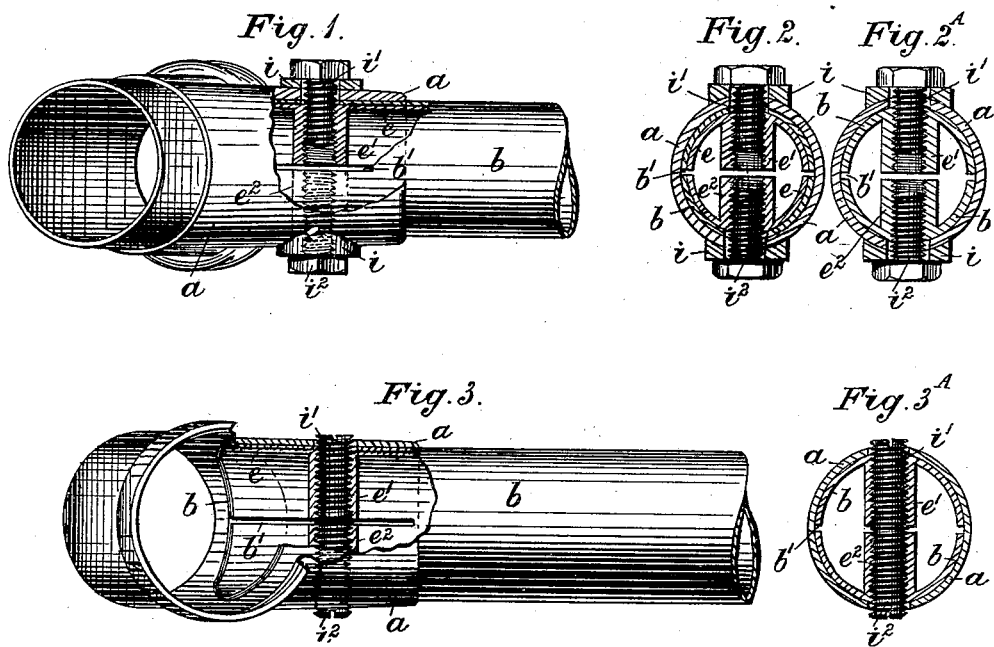

HENRY BELCHER AND FREDERICK EASOM, OF BEESTON, ENGLAND.

JOINT FOR BICYCLE-FRAMES.

SPECIFICATION forming part of Letters Patent No. 620,834, dated March 7, 1899.

Application filed January 8, 1898. Serial No. 666,077. (No model.)

*To all whom it may concern:*

Be it known that we, HENRY BELCHER and FREDERICK EASOM, subjects of the Queen of Great Britain, residing at Beeston, England, have invented new and useful Improvements in Joints for Bicycle-Frames, of which the following is a specification.

This invention relates to means for fixing the ends of the tubes of bicycle-frames into the lugs or sockets without brazing, but it may also be applied to the fixing together of the tubular parts of handle-bars, seat-pillars, forks, and other tubular parts of velocipedes.

Our invention consists in the construction, arrangement, and combination of parts hereinafter described, and illustrated in the accompanying drawings, for detachably fixing the ends of the frame-tubes and other tubular parts of velocipedes in their lugs and sockets, whereby a very secure attachment of the said tubes and parts can be readily and quickly effected, and when required for transit, storage, or repair the said tubes and parts may be readily detached and packed into a small compass. Further, by the arrangement constituting our invention the manufacture of bicycle-frames and the like is simplified and the temper of the metal of the tubes is not interfered with. The said construction and arrangement also provides a more efficient connection of the frame-tubes and other tubular parts of velocipedes than is obtained in detachable joints of the ordinary construction, the accidental detachment of joints constructed according to our invention being practically impossible.

Our invention is especially useful where the frame-tubes and other tubular parts of velocipedes and like vehicles are made of aluminium or alluminium alloys in consequence of the difficulty which exists in obtaining a secure attachment of the parts of articles made of aluminium or aluminium alloys by brazing.

We will describe our invention in connection with the attachment of the top horizontal tube of the frame of a safety-bicycle to the top lug of the said frame.

In the accompanying drawings, forming a part of this specification, Figure 1 is a bottom plan view, partly in section, of the top lug and portion of the top horizontal tube of a safety-bicycle frame, the said tube being fixed in the lug by our improved means. Fig. 2 is a cross-section thereof. Fig. 3 is a top plan view, partly in section, of a modified form of joint. Figs. $2^A$ and $3^A$ represent cross-sections of slightly-modified forms of the two arrangements of our invention.

The same letters of reference indicate the same parts in the several figures of the drawings.

Referring to Figs. 1 and 2 of the drawings, the letter $a$ indicates a tubular lug or socket, and $b$ the top horizontal tube of a bicycle-frame. The end of the tube $b$ is disposed in the lug $a$, and within the tube $b$ is arranged a tubular liner $e$, the said liner having fixed transversely in it a cross-tube which is internally screw-threaded. The part of the tube $b$ and liner $e$ within the lug $a$ are slit longitudinally by a saw-cut, as at $b'$ $b'$, which at the same time divides the cross-tube into two parts or nuts $e'$ $e^2$, each of which is carried by one of the elastic sides or divided parts of the liner $e$. Screw-pins $i'$ $i^2$ are passed through opposite and coincident holes in the lug $a$ and frame-tube $b$ and are made to take in the threaded tubes $e'$ $e^2$ in the liner $e$, the heads of the screw-pins bearing against washers $i\,i$, placed at opposite sides of the lug $a$. When the screw-pins $i'$ $i^2$ are screwed up, the two parts of the elastic end of the tube $b$ are slightly separated and made to bind with great firmness on the inner surface of the lug.

Instead of providing the screw-pins $i'$ $i^2$ with hexagonal or other shaped heads, they may be without heads and be of such a length that when driven home their outer ends will be flush or nearly flush with the outer surface of the lug. In such case the outer ends of the two screw-pins $i'$ $i^2$ have nicks made in them, as shown in Fig. 3, to facilitate the screwing and unscrewing of the screw-pins by the aid of a screw-driver, and the said screw-pins are made of such a length that when driven home their ends abut against each other, the opening of the slits and expansion of the end of the tube $b$ being effected by the screwing up of one or the other of the two screw-pins after their inner ends have been brought in contact.

In each of the described arrangements the interior of the lug may be made slightly conical, the elastic or slit end of the cylindrical tube $b$ taking the conical form of the interior of the lug when it is expanded in place.

Where the tube $b$ is of steel and of a gage or thickness to render the use of a liner unnecessary, the cross-tube is fixed directly in the slit end of the tube $b$, as is represented in Figs. 2$^A$ and 3$^A$.

The application of our invention to the fixing of other parts of cycle and like frames in their lugs and to the fixing together of the tubular parts of handle-bars, seat-pillars, and other tubular parts of velocipedes and like vehicles differs in no essential respect from its application to the fixing of the top horizontal tube of a safety-bicycle in the top lug, as hereinbefore described. Further, we wish it to be understood that our improvements are applicable to the fixing of tubes and other parts in their lugs or sockets, which tubes and other parts have a form in cross-section other than circular.

Having described our invention, what we claim is—

1. In a bicycle-frame joint, the combination with the tubular lug $a$, of the frame-tube $b$ having a longitudinally-slit end arranged in said lug, the slit liner $e$ within the slit end of said tube each of the slit portions of the liner being provided on its inner side with a nut and means for forcing said nuts apart to expand the slit end of the frame-tube in the lug substantially as described.

2. In a bicycle-frame joint, the combination with the tubular lug $a$, of the frame-tube $b$ having a longitudinally-slit end arranged in said lug, the slit liner $e$ within the slit end of said tube $b$ each of the slit portions of the liner being provided with an inwardly-projecting and internally-screw-threaded nut or tube, and screws passed through coincident holes in the lug and frame-tube and engaging the screw-threaded tubes substantially as described.

3. In a bicycle-frame joint, the combination with the tubular lug, of a longitudinally-slit tube arranged therein, nuts arranged opposite each other within said tube, and means for forcing said nuts apart to expand the slit end of the tube in the lug, substantially as described.

In testimony whereof we have hereunto set our hands in presence of two subscribing witnesses.

HENRY BELCHER.
FREDERICK EASOM.

Witnesses:
WM. WHITTLEY,
W. F. GRUNED.